US006816834B2

(12) United States Patent
Jaroker

(10) Patent No.: US 6,816,834 B2
(45) Date of Patent: Nov. 9, 2004

(54) SYSTEM AND METHOD FOR SECURE REAL-TIME HIGH ACCURACY SPEECH TO TEXT CONVERSION OF GENERAL QUALITY SPEECH

(76) Inventor: Jon Jaroker, 2000 Broadway, #15E, New York, NY (US) 10023

( * ) Notice: Subject to any disclaimer, the term of this patent is extended or adjusted under 35 U.S.C. 154(b) by 136 days.

(21) Appl. No.: 10/280,302

(22) Filed: Oct. 23, 2002

(65) Prior Publication Data

US 2004/0083105 A1 Apr. 29, 2004

(51) Int. Cl.$^7$ .............................................. G10L 15/26
(52) U.S. Cl. ...................................... 704/235; 704/243
(58) Field of Search ................................ 704/235, 243, 704/245, 260; 379/88.01

(56) References Cited

U.S. PATENT DOCUMENTS

| | | | | |
|---|---|---|---|---|
| 3,660,616 A | * | 5/1972 | Davidge et al. ............ | 360/72.2 |
| 5,655,058 A | * | 8/1997 | Balasubramanian et al. ..... | 704/255 |
| 5,659,662 A | * | 8/1997 | Wilcox et al. ............... | 704/245 |
| 6,076,059 A | * | 6/2000 | Glickman et al. ........... | 704/260 |
| 6,243,676 B1 | * | 6/2001 | Witteman .................... | 704/243 |
| 6,636,238 B1 | * | 10/2003 | Amir et al. .................. | 345/730 |

* cited by examiner

Primary Examiner—Daniel Abebe
(74) Attorney, Agent, or Firm—Fay Kaplun & Marcin, LLP

(57) ABSTRACT

A method, comprising the steps of receiving an audio stream, filtering the audio stream to separate identifiable words in the audio stream from unidentifiable words, creating a word text file for the identifiable words and storing the word text file in a database, the word text file including word indexing information. Creating audio segments from the audio stream, the audio segments including portions of the audio stream having unidentifiable words, creating audio shreds from the audio segments, the audio shreds including audio shred indexing information to identify each of the audio shreds and storing the audio shred indexing information in the database. Mixing the audio shreds with other audio shreds from other audio streams, delivering the audio shreds to a plurality of transcribers, transcribing each of the audio shreds into a corresponding audio shred text file, the audio shred text file including the audio shred indexing information corresponding to the audio shred from which the audio shred text file was created and reassembling the audio shred text files and the word text files into a conversation text file corresponding to the audio stream.

21 Claims, 5 Drawing Sheets

SYSTEM AND METHOD FOR SECURE REAL-TIME HIGH ACCURACY SPEECH TO TEXT CONVERSION OF GENERAL QUALITY SPEECH

BACKGROUND INFORMATION

Local telephone companies offer Call Forward on Busy ("CFB"), Call Forward on No Answer ("CFNA"), Call Forwarding ("CF"), Distinctive Ring and other services. FIG. 1 shows a traditional phone system 1 which may offer the services described above. When a user of the traditional phone system 1 places a call, the system has an Automatic Number Identification ("ANI") service 10 that identifies the number from which the call has been placed. Similarly, the traditional phone system 1 has a Dialed Number Identification Service ("DNIS") service 20 which identifies the number that the caller dialed. This information is received by the local phone company 30 and the call is directed to the receiving phone which is termed a Plain Old Telephone Service ("POTS") device 40.

SUMMARY OF THE INVENTION

A system, comprising an audio shredder receiving an audio segment, the audio segment being a portion of an audio stream, the audio shredder creating an audio shred from the audio segment, an audio mixer receiving the audio shred and randomizing the audio shred with other audio shreds from other audio streams and a plurality of transcribers, wherein one of the transcribers receives the audio shred and transcribes the audio shred into text.

In addition, a method, comprising the steps of receiving an audio stream, filtering the audio stream to separate identifiable words in the audio stream from unidentifiable words, creating a word text file for the identifiable words and storing the word text file in a database, the word text file including word indexing information. Creating audio segments from the audio stream, the audio segments including portions of the audio stream having unidentifiable words, creating audio shreds from the audio segments, the audio shreds including audio shred indexing information to identify each of the audio shreds and storing the audio shred indexing information in the database. Mixing the audio shreds with other audio shreds from other audio streams, delivering the audio shreds to a plurality of transcribers, transcribing each of the audio shreds into a corresponding audio shred text file, the audio shred text file including the audio shred indexing information corresponding to the audio shred from which the audio shred text file was created and reassembling the audio shred text files and the word text files into a conversation text file corresponding to the audio stream.

Furthermore, a system, comprising a service platform for receiving, processing and directing streaming audio and a user device connected to the service platform and configured to receive streaming audio from the service platform and transmit streaming audio to the service platform, the user device further configured to signal the service platform to begin a transcription of the streaming audio transmitted and received by the user device. The service platform including a filter receiving the streaming audio, identifying words within the streaming audio and creating a word text file corresponding to each of the identified words, the filter further creating audio segments from the streaming audio, the audio segments including portions of the audio stream having unidentifiable words, an audio shredder creating a plurality of audio shreds from each of the audio segments, an audio mixer randomizing the audio shreds with other audio shreds from other streaming audio, wherein the service platform delivers the randomized audio shreds to a plurality of transcribers which transcribe the audio shreds into audio shred text files corresponding to the audio shreds, and a reassembler creating a conversation text file corresponding to the streaming audio from the audio shred text files and the word text files.

A system, comprising an audio stream element including information corresponding to an audio stream, the information including a begin time of the audio stream, an end time of the audio stream, a conversation identification of the audio stream and the audio stream file, a word element including information corresponding to a word identified in the audio stream by a speech recognition filter, the information including an identification of the audio stream from which the word was identified, a begin time of the word, an end time of the word, an audio file of the word and text corresponding to the word, an audio segment element including information corresponding to an audio segment of the audio stream, the audio segment being a portion of the audio stream without identifiable words, the information including the identification of the audio stream from which the audio segment originates, the begin time of the audio segment, the end time of the audio segment and the audio file of the audio segment, an audio shred element including information corresponding to an audio shred of the audio segment, the information including an identification of the audio segment from which the audio shred originates, the begin time of the audio shred, the end time of the audio shred and the audio file of the audio shred and a text token element including information corresponding to a textual representation of the audio shred, the information including an identification of the audio shred from which the textual representation originates and the textual representation. The information included in each of the audio stream element, the word element, the audio segment element, the audio shred element and the text token element is processed to generate a text transcription of the audio stream.

DETAILED DESCRIPTION

Figure 1:
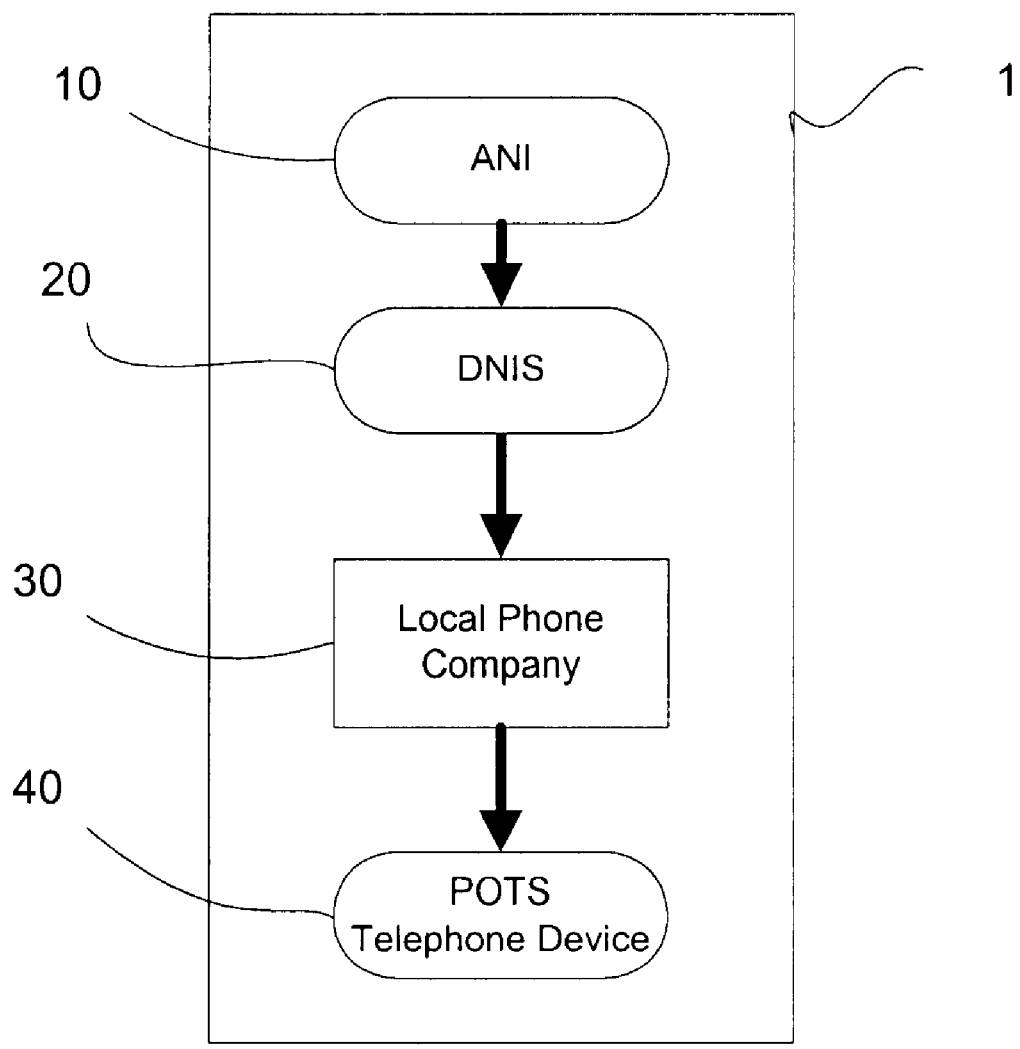
FIG. 1 depicts a traditional phone system.
Figure 2:
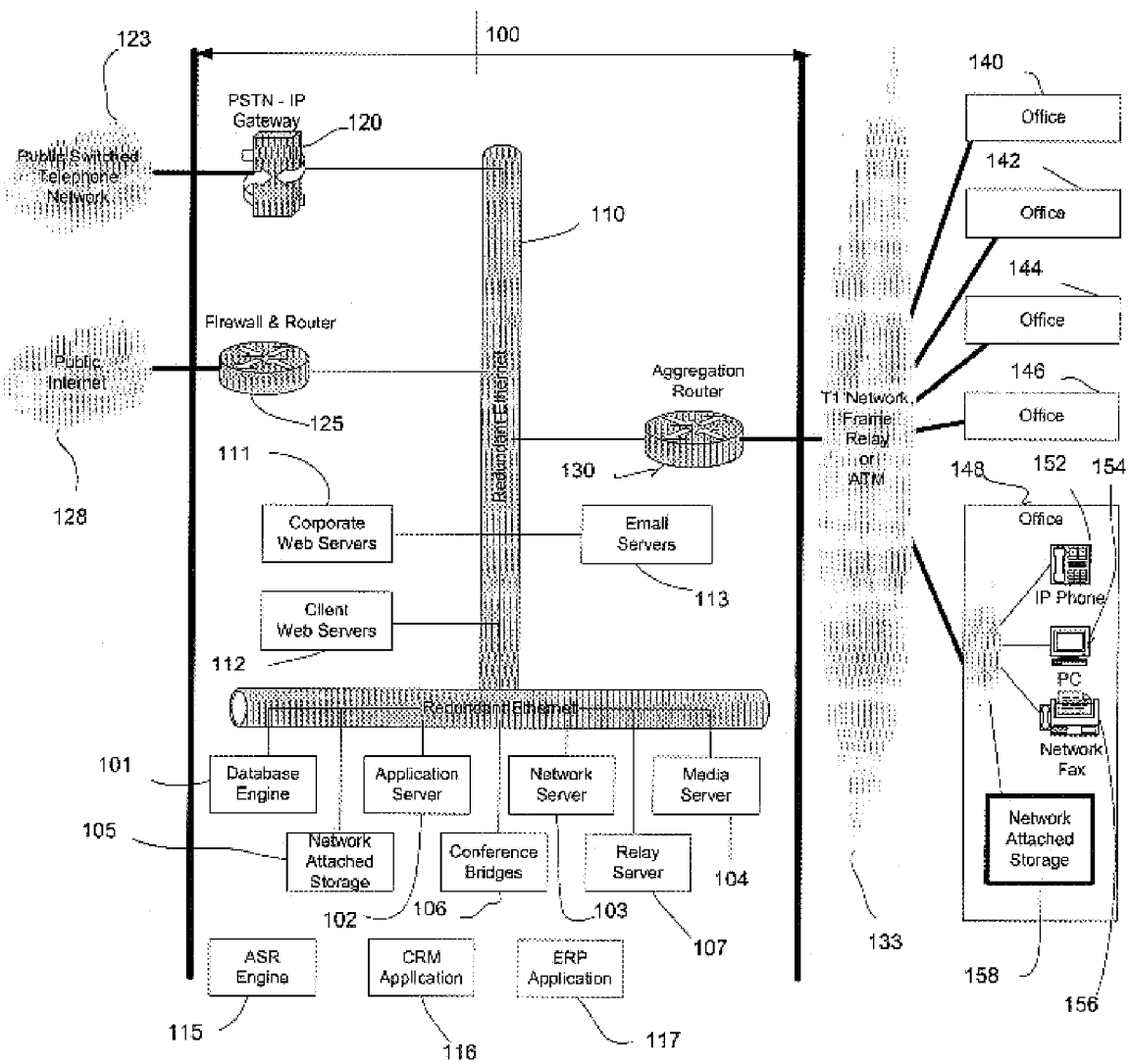
FIG. 2 shows an exemplary platform that may be used to implement the present invention.

The present invention may be further understood with reference to the following description and the appended drawings, wherein like elements are provided with the same reference numerals. FIG. 2 shows an exemplary platform 100 that may be used to implement the present invention. Those of skill in the art will understand that platform 100 is only exemplary and that the present invention may be implemented on numerous other platforms. The platform 100 components in FIG. 2 is shown between the two lines denoting that the platform 100 components may be located within the same facility. However, those of skill in the art will understand that the platform 100 components may be distributed to any physical location. In addition, it may also be considered that the components located at the user locations 140–148 may also form part of the platform 100.

The platform 100 includes a series of general purpose servers 101–107 which perform specific functions to deliver resources to the users of the platform 100. The resources include database services provided by database server 101, applications provided by application server 102, network service provided by network server 103, media services provided by media server 104, data storage provided by network attached storage 105, conferences services provided by conference bridges 106 and relay services provided by relay server 107. For example, the application server 102 may contain all the call control applications for the platform 100 to manage phone calls. The application server 102 may request resources from the other servers and/or hand off calls to the other servers based on the resource needed to handle the call. Those of skill in the art will understand that these resources and the providing servers are only exemplary, additional servers and/or resources may be added to the platform 100 as needed.

The servers 101–107 are connected to each other and to the remaining components of the platform 100 via a redundant Ethernet 110 (or any other data pipeline) which provides fast and reliable communication between platform components. Other services provided by the platform 100 may include electronic mail ("email") services via email server 113, corporate and client web services via corporate web server 111 and client web server 112. The platform 100 may also include an automatic speech recognition ("ASR") engine 115, customer relationship management ("CRM") applications 116 and enterprise resource planning ("ERP") applications 117. All of the above resources, services and applications are used to provide service to the users 140–148 of the platform 100. Those of skill in the art are familiar with the types of services and functions provided by these resources.

The platform 100 may also include a PSTN-IP Gateway 120 which receives phone calls directed for the users 140–148 from the public switched telephone network ("PSTN") 123. The phone calls directed from the PSTN 123 may be in the form of analog signals which are converted to digital signals by the PSTN-IP Gateway 120. The conversion of analog signals to digital signals (e.g., data packets) is well known in the art. In the area of telephony, the concept of transmitting voice data in the form of data packets may be referred to as Voice over Internet Protocol ("VoIP"). Throughout this description, the platform for processing and transmitting these data packets may be referred to as VoIP platforms, but those of skill in the art will understand that the Internet Protocol is only one example of protocol which may be used to transmit data over a network and the present invention may be implemented using any protocol for data packet transmission.

The data packets are then distributed to the platform 100 via the redundant Ethernet 110. The resources of the platform 100 perform the necessary processing on the data packets and the phone call (in the form of data packets) is then directed via aggregation router 130 to the correct user 140–148. The type of processing performed by the platform 100 resources depends on the services provided by the platform 100 and the services for which each user 140–148 has contracted. Examples of features and services will be described in greater detail below.

The connection from the user 140–148 locations and the platform location may be via any fast and reliable communication link 133, for example, a T1 circuit, a frame relay network, an asynchronous transfer mode ("ATM") network, etc. The individual links to users 140–148 (e.g., T1 links) may be combined into a single digital link (e.g., a DS3 link) between the aggregation router 130 and the communication link 133. The data being sent across the single digital link may need to be multiplexed or de-multiplexed based on the direction of the network traffic and these functions may be carried out by the aggregation router 130. The phone call may then be transferred to an internal network at the user location, e.g., the network 150 of user 148, which may distribute the phone call to various devices within the user location, e.g., IP phone 152, personal computer 154, network facsimile 156 and network attached storage 158.

For example, a third party may be attempting to make a voice phone call from a POTS device (not shown) to the user 148. The third party will dial a phone number that is related to the user 148. As will be described in greater detail below, each user 140–148 may have one or more traditional phone numbers that may be used to contact the user. The phone call placed by the third party will be routed via the PSTN 123 to the PSTN-IP Gateway 120 of the platform 100. The analog phone call will be converted to a digital signal by the PSTN-IP Gateway 120 and the digital signal will be processed by the various platform 100 resources. The signal will be routed through aggregation router 130 to the communication link 133 and directed to the network 150 of the user 148. Since this communication is a voice communication, the network 150 may then direct the data packets for the phone call to the IP phone 152 which converts the digital signal into an audio signal for the user to converse with the third party caller. As will be described in greater detail below, users 140–148 may select the location (or device) to which voice and/or data communications are to be directed, including simultaneously directing communications to multiple devices that are either directly or indirectly connected the platform 100. This entire exemplary communication takes place in the same real time manner as a normal POTS line to POTS line phone call. The fact that the signal is converted to data packets is transparent to both the user of the IP phone 152 and the third party caller.

Similarly, data transmissions from the public internet 128 (or any other communications network) may be routed to the platform 100 through firewall and router 125 which protects the platform 100 from unwanted access. These data transmissions are already in digital form (e.g., data packets) and are passed via the redundant Ethernet 110 to the components of the platform 100 for processing. The platform 100 then transmits the data transmission via the aggregation router 130 and communication link 133 to the user 140–148 to which the data transmission was directed. For example, a third party may direct an email to an IP address owned by the user 148. The email communication may be sent via the public internet 128 which directs it to the platform 100 based on the IP address or other alias within the data packets of the email. The email is received and directed through firewall and router 125 and distributed to the various platform 100 resources via the redundant Ethernet 110. In this example, the email may be directed to the email servers 113 where the data packets are processed and to the network attached storage 105 where a copy of the email is stored. Those of skill in the art are familiar with the operation of email servers. The email may then be directed from the email server 113 of the platform 100 via the aggregation router 130 and communication link 133 to the network 150 of the user 148. In this case since the email is a data communication, the user 148 may have configured the data communication to be directed to the personal computer 154.

Those of skill in the art will understand that the communication traffic (voice and data) may flow in either direction through the platform 100. Thus, in addition to the examples described above, a user 140–148 may place a voice phone call that gets directed to the PSTN 123 or send an email that gets directed to the public internet 128. Similarly, users 140–148 may communicate directly via the platform 100.

Speech to Text Applications: As described above, the VoIP platform allows for the implementation of various features and applications which enhance the phone service of users. A first exemplary feature of speech to text applications, referred to as a transcription service, will be described. The speech may be in any form, for example, a recorded voice mail, a running conversation between two or more parties, a single party dictating, multiple individuals in a room conversing, etc. The text that is generated by these applications may be a text file which a user may store, view and edit or a real time scrolling text that is displayed on, for example, a CRT or LCD screen of a computing device. The exemplary embodiment of the transcription service according to the present invention will be described as being implemented on the exemplary platform 100 described with reference to FIG. 2. However, those of skill in the art will understand that the exemplary embodiment of the transcription service may be implemented on any platform through which audio data is streamed or where audio files are stored, including non-telephony related platforms.

Figure 3:
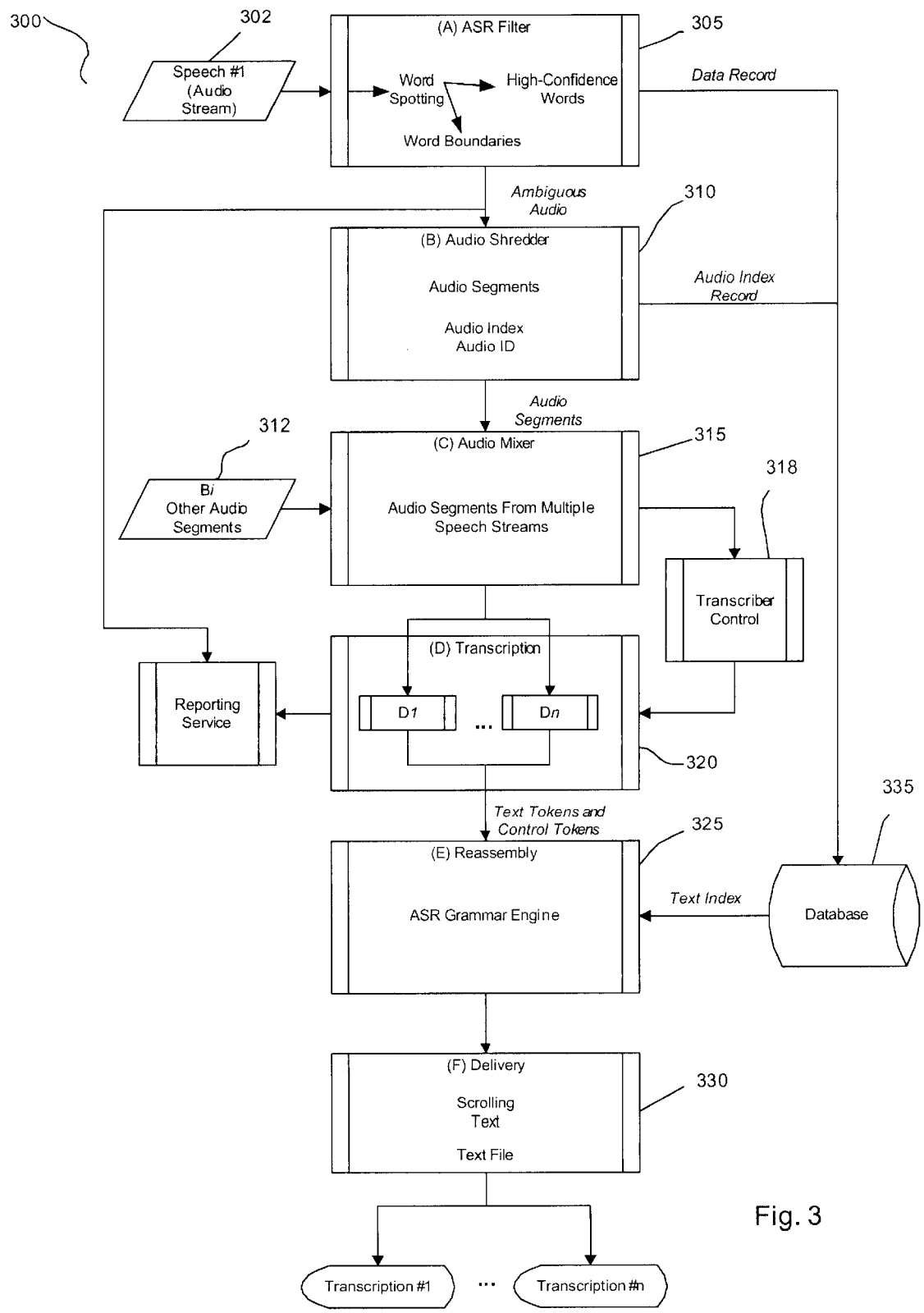
FIG. 3 shows an exemplary system for the transcription of speech to text according to the present invention.

FIG. 3 shows an exemplary system 300 for the transcription of speech to text. An audio stream 302 is input into an ASR filter 305. The audio stream may be tapped from a conversation, streamed from a stored file or a real time dictation. If, for example, the speech was tapped from a conversation between a user 148 using the IP phone 152 and a third party caller using the PSTN 123, the entire conversation would be streamed through the platform 100. The user 148 may have selected that the present conversation should be transcribed or saved in a text form. As the conversation is streaming through the platform 100, it may branched into one or more of the various servers which provide the transcription service. It should be noted that the exemplary transcription service according to the present invention does not need to record or keep a record of the audio information. Therefore, the tapped audio stream may be erased and discarded as the transcription (or text file) is created.

Continuing with the above example of the user 148 on the IP phone 152 having a phone conversation with a third party caller, the user 148 may decide that the conversation should be transcribed and the user 148 may initiate the transcription service offered by the platform 100. The user may initiate the service in a variety of manners, for example, the IP phone 152 may have a button or key combination that when pressed sends a signal to the platform 100 to initiate transcription. In another example, the PC 154 may display a graphical user interface ("GUI"), e.g., a web page, showing the different features and functions offered by the platform 100. The GUI may include a feature that allows the user to click on a button to start the transcription service. When the user 148 sends the signal to the platform 100 to begin transcription, the signal may be received by, for example, the application server 102 which may implement the transcription service alone or in combination with the other resource servers. For example, the application server may access the database engine 101 to determine which user sent the transcription request, the ASR engine 115 in order to access the ASR services, the network server 103 to branch the packets associated with the correct conversation, etc.

Referring back to FIG. 3, the ASR filter 305 may be, for example, the ASR engine 115 of platform 100. The ASR filter 305 may convert a portion of the raw audio into text using ASR techniques that are generally known. Since the speech is conversation quality, only a small portion of the conversation will be recognized by the ASR filter 305. A general technique used by ASR filters is to spot words and those words which are recognized with a high degree of confidence (e.g., 99% or greater) may be sent directly to a storage database 335. The text of the words that are sent to the database also include indexing information to allow the word to be placed back within the conversation at the correct location when the speech is reassembled. A more detailed description of the data structure for the indexing will be given below.

Figure 4:
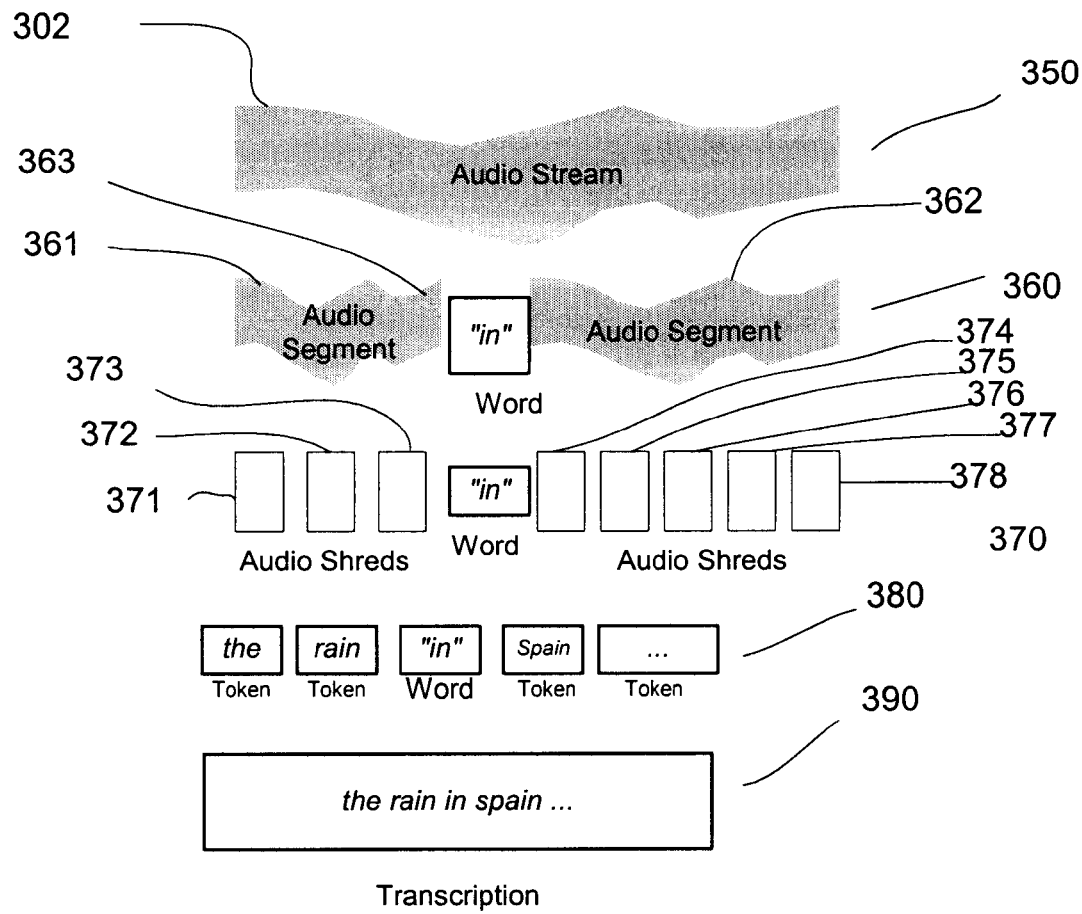
FIG. 4 shows an exemplary audio stream in the various stages as it is transformed into a transcription according to the present invention.
Figure 5:
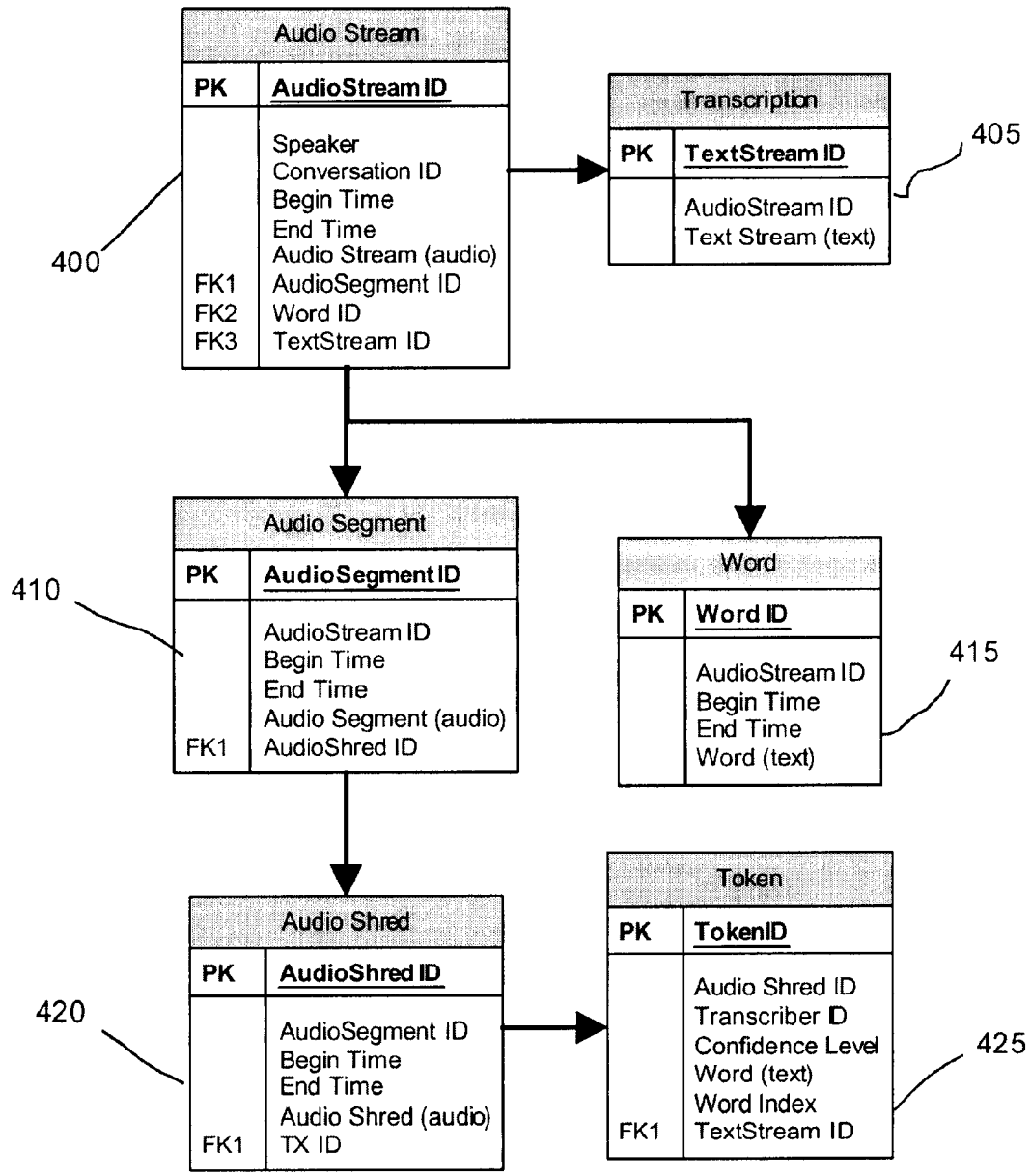
FIG. 5 shows exemplary data structures which may be used to index the data associated with the audio stream as it is transformed into the transcription according to the present invention.

FIG. 4 shows an exemplary audio stream 302 in the various stages 350–390 as it is transformed into text. FIG. 5 shows exemplary data structures 400–425 which may be used to index the data associated with the audio stream 302 as it is transformed into the text. In this example, the audio stream 302 in stage 350 is a representation of the speech "the rain in spain." The audio stream 302 may have an associated data structure 400 (FIG. 5). The data structure 400 may be any type of data structure, for example, a database record, an array, a table, a linked list, etc. The data structure 400 may be stored in the database 335 (FIG. 4) or any other storage location that may be accessed by the platform providing the transcription service. Those of skill in the art will understand that the data structure 400 and the other data structures described are only exemplary and it may be possible to use different data structures to implement the exemplary embodiment of the present invention.

The data structure 400 for audio stream 302 may be assigned an AudioStreamID (e.g., AudioStream1) and include information such as the speaker ID, the conversation ID, the begin and end time of the audio stream 302, and the actual audio stream 302. Audio that is coming from a specific device (e.g., the IP phone 152) may be ascribed to a single user that is associated with that device. If the speaker is the third party caller, the speaker ID may be associated with the telephone number of the third party caller. As described above, the platform 100 has the ANI information (in the case of a third party caller) or the DNIS information (in the case of the third party receiving the call) so the speaker ID may be the third party number (e.g., speaker from 555–1000). In the case where there are multiple parties on a speaker or conference phone, a speaker identification system, for example, based on biometrics, may be used to identify the party speaking (e.g., speaker "A" from conference line 555–8000).

The conversation ID may be used to identify the audio stream with the particular conversation from which it came. For example, the audio stream 302 "the rain in spain" may be only a small portion of a conversation which contains hundreds or thousands of words. For the transcription to be accurate, the transcription of every audio stream in the conversation needs to be indexed to the conversation. Thus, every audio stream from the conversation will index back to the conversation ID. The begin time and end time of the data structure are also used to index to the correct conversation because not only do all the words from the conversation need to be identified with the conversation, but the words need to be assembled in the correct temporal order to have an accurate transcription. The time information may be indexed to absolute time (e.g., day/time) as kept by the platform or as some relative time (e.g., time as measured from the start of the conversation). The exemplary embodiment of the transcription service will use (or process) the actual audio stream 302 to create the transcription of the audio. The audio segment ID, word ID and TextStream ID of the data structure 400 will be described in detail below.

Referring back to FIG. 3, the exemplary audio stream 302 may be input into the ASR filter 305. In this example, the ASR filter 305 recognizes one word of the audio stream 302, i.e., "in" 363 as shown in stage 360 of FIG. 4. A text representation of the word "in" and indexing information for the word may then be stored in the database 335 for when the speech is later reassembled. The data structure 415 for the stored word is shown in FIG. 5. The data structure 415 may be assigned a WordID and include the AudioStreamID from which the word was identified (e.g., AudioStream1), the beginning and end time of the word, and the actual text file for the word, e.g., "in". Once again, this word index will be used at a later time to reassemble the conversation into the transcription. Each word that is identified by the ASR 305 will have a separately stored data structure in database 335. The data structure 400 for the audio stream 302 may also store (or have a pointer to) the WordID for each word in the audio stream 302.

The result of the audio stream 302 being input into the ASR filter 305 is that the audio stream is broken into recognized words and ambiguous audio segments. Referring to FIG. 4, this is shown in stage 360 where the recognized word "in" 363 separates two ambiguous audio segments 361–362. The recognized words (e.g., "in" 363) set up word boundaries which separate the ambiguous audio segments as shown in stage 360. Each of the audio segments 361–362 also have an associated data structure 410. The data structures 410 for the audio segments 361–362 are each assigned an AudioSegmentID (e.g., AudioSegment1 and AudioSegment2 and the data structure includes the AudioStreamID of the audio stream from which the segment is derived, the begin and end time of the audio segment and the actual audio segment. In this example, the begin time of the first audio segment 361 is the begin time of the audio stream 302 from which it is derived and the end time is the begin time of the identified word 363. For the second audio segment 362, the begin time is the end time of the identified word 363 and the end time is the end time of the audio stream 302 from which it is derived. The AudioShredID will be described in greater detail below. The data structure 400 for the audio stream 302 may also store (or have a pointer to) the AudioSegment ID for each audio segment in the audio stream 302. Thus, the initial audio stream has been segmented into identified words and ambiguous audio segments.

Referring back to FIG. 3, the ambiguous audio segments (e.g., the segments 361–362) may then be directed to an audio shredder 310 which breaks the ambiguous segments into multiple audio shreds, for example, 3–5 second audio shreds. However, the duration of the audio shreds is adjustable and may be set to accommodate the longest possible words, but short enough to eliminate all context from the conversation. A similar ASR engine as used for ASR filter 305 may be used to implement the audio shredder 310. However, in this case, the ASR engine will not identify specific words, but may identify pauses between words, i.e., word boundaries. In the ideal case, each audio shred will start at the beginning of a word and end at the end of a word. The beginning and end may be the same word or it may be multiple words. There may be instances where multiple words are preferred because it may be easier to transcribe the audio of several words rather than just one.

The audio shreds may overlap, i.e., the same portion of an audio segment may appear in two audio shreds. This may add fault tolerance to the audio shreds. For example, while the audio shredder 310 attempts to break the shreds at word boundaries, it may not always be successful and an audio shred may contain only a portion of a word in the audio stream making the word unrecognizable. However, an overlapping shred may contain the entire word making it possible to correctly reconstruct the conversation. The overlapping shreds may also be used as an accuracy check. For example, the same word may appear in two audio shreds which are sent to two different transcribers. If both transcribers accurately transcribe the word, there is a higher degree of confidence in the accuracy of that word as opposed to a single transcriber transcribing the word. If, on the other hand, the two transcribers disagree, there may be a series of checks and/or processes that can be used to determine which word is correct. Such comparisons may also be used to assess the accuracy of the transcribers.

Referring to FIG. 4, stage 370 shows that the audio segments 361–362 of stage 360 have been shredded into the audio shreds 371–373 and the audio shreds 374–378, respectively. Each of the audio shreds are indexed and the index information is stored in the database 335 in, for example, the data structure 420 of FIG. 5. There is a data structure 420 for each audio shred and each data structure is assigned an AudioShredID, the data structure including the AudioSegmentID of the audio segment from which the shred is derived, e.g., the audio shred 371 will contain the AudioSegmentID of the audio segment 361. The data structure 420 may also include the begin and end time for the audio shred and the actual audio of the shred. Once again, this information for the audio shred may be used later to reassemble the audio stream 302. The data structure 410 for the audio segments may also store (or have a pointer to) the AudioShredID for each audio shred in the audio segment.

Referring back to FIG. 3, the audio shreds may be input into an audio mixer 315 and randomized with audio shreds from other audio streams 312 from multiple conversations. Thus, an audio shred from a real time conversation may be randomized with an audio shred from a different conversation, from a voice mail recording, etc. As described above, the short duration of the audio shreds removes the context from each of the audio shreds. The process of mixing the audio shreds with other random audio shreds assures that the transcribers who hear the audio shreds (discussed below) cannot reassemble any one conversation from memory because the transcribers are only hearing random shreds of multiple audio streams from multiple conversations.

The multiple audio shreds are then transmitted to live agent transcribers 320 who may listen to the audio shreds and type the corresponding audio word into text. The transcription control 318 may control the actual transcriber that receives the audio shreds based on a number of criteria along with monitoring transcriber status (e.g., available, working, unavailable, etc.) and performance metrics such as accuracy and speed. For example, the platform 100 may have one hundred simultaneous two-way conversations which are being transcribed. The audio mixer 315 is randomizing audio shreds from each of these one hundred conversations. The audio mixer sends these audio shreds to the transcribers 320 in order to have the text associated with the shreds transcribed. There is no need to centrally locate the transcribers 320. Each of the transcribers 320 may be located in a different location which is remote from the other transcribers and from the platform 100. The only requirement for the location of the transcriber is that it have a secure data connection from the platform 100 so that the transcriber may securely receive the audio shreds. For example, the transcribers 320 may receive the audio shreds over a data connection (e.g., internet dial-up access) in a manner similar to the delivery of electronic mail.

The transcriber control 318 will monitor which transcribers 320 are available and direct an audio shred to an available transcriber 320. When the transcriber 320 receives the audio shreds, the transcriber control will indicate that the transcriber is working and the transcriber 320 will not receive additional audio shreds until the transcriber finishes with the current audio shred. In addition, the transcriber control 318 may monitor the number of audio shreds from a single conversation that a particular transcriber receives in order to assure that the individual transcriber may not piece together the conversation. The transcriber 320 receives the audio shred in the form of data packets that are sent to a PC the transcriber 320 is using. The data packets may include the data structure 420 for the audio shred, including the actual audio for the audio shred. The audio may be played, for example, via a media player on the PC and as the transcriber 320 hears the word or words in the audio shred, the text for these words may be typed into the PC, for example, via a dialog screen.

As the transcriber is typing in the words, a data structure 425 is created for the text which is entered. This text may be referred to as a token. Thus, the data structure 425 is assigned a TokenID and may include the AudioShredID from which the token was transcribed, the identification of the transcriber (TranscriberID), a confidence level (i.e., the level of confidence of the transcriber 320 that the transcription was accurate), the actual text of the word or words and a word index. There may be cases of ambiguities such as inaudible words where the transcriber 320 cannot accurately enter the text corresponding to the spoken word. In these cases, the transcriber 320 may enter an error code which indicates problems such as an error in the transmission (e.g., static), homonym ambiguities, inaudible speech, etc. The transcriber 320 may adjust the confidence level commensurate with such errors. For example, if there was static in the audio shred, the transcriber may enter a code corresponding to static and a confidence level of zero (0) indicating there is no confidence in the transcription because of the error. The data structure 420 for the audio shreds may also store (or have a pointer to) the TokenID for each token in the audio shred.

Thus, at this point each word in the original audio stream 302 is in text form. Referring to stage 380 of FIG. 4, the text of the words were either determined by the ASR filter 305 and stored in the form of a word data structure 415 in database 335 or determined as part of a token by the transcribers 320. These data structures containing the actual text of the words and the associated indexing information are input into the reassembler 325 where the words and tokens are reassembled. As described above, each of the words and tokens are indexed to the audio stream and their location within the audio stream and this indexing information may be used to reassemble the text into a coherent text representation of the audio stream. Those of skill in the art will understand that the indexing information from the words (data structure 415), the tokens (data structure 425) and the other data structures 400, 410 and 420 may be combined in order to correctly reassemble the audio stream.

As described above, in some instances the audio shreds will overlap, thus the text from the corresponding tokens will also overlap. The reassembler 325 may eliminate these overlapping words to accurately reflect the conversation. In addition, where the transcriber entered an ambiguity, the reassembler 325 may compare the overlaps to eliminate the ambiguities. The reassembler 325 may also contain a grammar engine which aids in the reassembly of the audio stream. For example, a word or token may contain a homonym, e.g., by and buy. The grammar engine may resolve such ambiguities as the text file is being created.

The output of the reassembler 325 is a text stream having the data structure 405 as shown in FIG. 5. The text stream is assigned a TextStream ID and includes the AudioStreamID of the audio stream from which the text steam is derived and the actual text of the text stream. The stage 390 of FIG. 4 shows the transcription output of the exemplary audio stream 302. The reassembler 325 not only reassembles the audio streams, but also reassembles the conversations from which the audio streams are derived. Thus, the text stream output may include the entire conversation, not just the single audio stream. The output of the reassembler 325 is sent to a delivery module 330 which delivers the text output in the manner prescribed by the user, e.g., a text file, scrolling text, etc.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:
    an audio shredder receiving an audio segment, the audio segment being a portion of an audio stream, the audio shredder creating an audio shred from the audio segment;
    an audio mixer receiving the audio shred and randomizing the audio shred with other audio shreds from other audio streams; and
    a plurality of transcribers, wherein one of the transcribers receives the audio shred and transcribes the audio shred into text.

2. The system of claim 1, further comprising:
    a reassembler receiving the text corresponding to the audio shred and combining the text with other text corresponding to the audio stream to create a text file corresponding to the audio stream.

3. The system of claim 2, wherein the text and the other text includes indexing information, the reassembler using the indexing information to create the text file.

4. The system of claim 1, further comprising:
    a delivery module to deliver the text file corresponding to the audio stream.

5. The system of claim 4, wherein the delivery module is one of a display screen and a storage medium.

6. The system of claim 1, further comprising:
    a filter receiving the audio stream, identifying words within the audio stream and creates a word text file corresponding to each of the identified words, the filter creating the audio segment from a portion of the audio stream having words which are unidentifiable by the filter.

7. The system of claim 6, further comprising:
    a database element which stores the word text file corresponding to each of the identified words, the database element further storing indexing information corresponding to the audio shred.

8. The system of claim 1, wherein the audio stream is one of a voice recording and a real-time conversation.

9. The system of claim 1, wherein the audio shred is a plurality of audio shreds and wherein a portion of a first audio shred overlaps a portion of a second audio shred.

10. The system of claim 9, wherein the first audio shred is transcribed by a first transcriber and the second audio shred is transcribed by a second transcriber and the overlapping portions of the first and second audio shreds are compared for accuracy.

11. The system of claim 1, further comprising:

a transcriber control element to monitor the availability of each of the transcribers and directing the audio shred to an available transcriber.

12. A method, comprising the steps of:

receiving an audio stream;

filtering the audio stream to separate identifiable words in the audio stream from unidentifiable words;

creating a word text file for the identifiable words;

storing the word text file in a database, the word text file including word indexing information;

creating audio segments from the audio stream, the audio segments including portions of the audio stream having unidentifiable words;

creating audio shreds from the audio segments, the audio shreds including audio shred indexing information to identify each of the audio shreds;

storing the audio shred indexing information in the database;

mixing the audio shreds with other audio shreds from other audio streams;

delivering the audio shreds to a plurality of transcribers;

transcribing each of the audio shreds into a corresponding audio shred text file, the audio shred text file including the audio shred indexing information corresponding to the audio shred from which the audio shred text file was created; and reassembling the audio shred text files and the word text files into a conversation text file corresponding to the audio stream.

13. The method according to claim 12, wherein a first boundary of a first audio segment being a first location in the audio stream corresponding to an end of a first identifiable word and a second boundary of the first audio segment being a second location in the audio stream corresponding to a beginning of a second identifiable word.

14. The method of claim 12, wherein there is a 99% degree of confidence for an identifiable word.

15. The method of claim 12, wherein the audio shreds are 3 to 5 seconds.

16. The method according to claim 12, wherein a boundary of each of the audio shreds are pauses between word in the audio segments.

17. The method according to claim 12, wherein each transcriber receives audio shreds and other audio shreds, the delivery of audio shreds to the transcribers being controlled to eliminate contextual meaning to the transcribers.

18. A system, comprising:

a service platform for receiving, processing and directing streaming audio; and a user device connected to the service platform and configured to receive streaming audio from the service platform and transmit streaming audio to the service platform, the user device further configured to signal the service platform to begin a transcription of the streaming audio transmitted and received by the user device, wherein the service platform includes a filter receiving the streaming audio, identifying words within the streaming audio and creating a word text file corresponding to each of the identified words, the filter further creating audio segments from the streaming audio, the audio segments including portions of the audio stream having unidentifiable words, an audio shredder creating a plurality of audio shreds from each of the audio segments, an audio mixer randomizing the audio shreds with other audio shreds from other streaming audio, wherein the service platform delivers the randomized audio shreds to a plurality of transcribers which transcribe the audio shreds into audio shred text files corresponding to the audio shreds, a reassembler creating a conversation text file corresponding to the streaming audio from the audio shred text files and the word text files.

19. The system according to claim 18, wherein the user device is one of an IP phone and a personal computer.

20. The system according to claim 18, wherein the service platform has a data connection to each of the transcribers for delivering the audio shreds.

21. A system, comprising:

an audio stream element including information corresponding to an audio stream, the information including a begin time of the audio stream, an end time of the audio stream, a conversation identification of the audio stream and the audio stream file;

a word element including information corresponding to a word identified in the audio stream by a speech recognition filter, the information including an identification of the audio stream from which the word was identified, a begin time of the word, an end time of the word, an audio file of the word and text corresponding to the word;

an audio segment element including information corresponding to an audio segment of the audio stream, the audio segment being a portion of the audio stream without identifiable words, the information including the identification of the audio stream from which the audio segment originates, the begin time of the audio segment, the end time of the audio segment and the audio file of the audio segment;

an audio shred element including information corresponding to an audio shred of the audio segment, the information including an identification of the audio segment from which the audio shred originates, the begin time of the audio shred, the end time of the audio shred and the audio file of the audio shred; and a text token element including information corresponding to a textual representation of the audio shred, the information including an identification of the audio shred from which the textual representation originates and the textual representation, wherein the information included in each of the audio stream element, the word element, the audio segment element, the audio shred element and the text token element is processed to generate a text transcription of the audio stream.

* * * * *